United States Patent [19]
Ulbrich et al.

[11] Patent Number: 5,918,685
[45] Date of Patent: Jul. 6, 1999

[54] HAND TOOL

[75] Inventors: Jens Ulbrich, Oberteuringen; Thomas Jeltsch, Markdorf, both of Germany

[73] Assignee: J. Wagner GmbH, Friedrichsagen, Germany

[21] Appl. No.: 08/882,857

[22] Filed: Jun. 26, 1997

[30] Foreign Application Priority Data

Jul. 3, 1996 [DE] Germany ............................ 196 26 731

[51] Int. Cl.⁶ ................................................. B25B 23/00
[52] U.S. Cl. .................................. 173/4; 81/429; 173/15; 173/170; 173/217; 408/202
[58] Field of Search ................... 173/2, 4, 5, 11, 173/13, 15, 18, 217, 170; 81/52, 57.11, 57.13, 57.14, 429; 408/202

[56] References Cited

U.S. PATENT DOCUMENTS

| 2,796,161 | 6/1957 | Graybill | 81/429 |
| 5,094,133 | 3/1992 | Schreiber | 173/15 |

FOREIGN PATENT DOCUMENTS

| 0345655 | 12/1989 | European Pat. Off. | 173/170 |
| 0591096 | 6/1995 | European Pat. Off. | |
| 3912991 | 10/1990 | Germany | 173/170 |

*Primary Examiner*—Stephen F. Gerrity
*Attorney, Agent, or Firm*—Faegre & Benson LLP

[57] ABSTRACT

A hand tool (1) having a drive motor (12), a depth stop (16) by which the drive motor (12) can be automatically switched off when it is in contact with a workpiece (4), and a switching mechanism (21) in an electric circuit (22). The electric circuit (22) includes a switch (24) for switching the drive motor (12) on and off, a first contact element (25) for reversing the polarity of the drive motor (12) and a second contact element (26) for switching off the drive motor (12) by the use of the depth stop (16). Also, a switching device (32) is connected to the drive motor (12) and is integrated into the electric circuit (22) so that the switching device (32) is arranged in a branch line (31) bypassing the second contact element (26) and by which the second contact element (26) can be bypassed in an open operating position caused by the depth stop (16) by actuation of the first contact element (25) for reversal of the direction of rotation of the drive motor (12), which makes it possible to switch the drive motor (12) from clockwise to counter-clockwise rotation or the reverse without the necessity of mechanical elements and without the necessity of any manual manipulation of adjustment elements.

20 Claims, 4 Drawing Sheets

HAND TOOL

BACKGROUND OF THE INVENTION

The invention relates to a hand tool, particularly for the accurate insertion of screws or the like, having an electric drive motor arranged in a housing for the operation of a tool bit such as a screwdriver bit, and an axially adjustable depth stop by means of which the drive motor can be switched off automatically when said depth stop contacts a workpiece, and having a switching mechanism connected to the drive motor, into the electric circuit of which are installed a switch for switching the drive motor on and off, a first contact element for reversing the polarity of the drive motor for clockwise and counter-clockwise rotation and a second contact element for switching off the drive motor by means of the depth stop.

A hand tool of this nature is disclosed by EP-0 591 096 A1. In order to be able bring about a reversal of the direction of rotation of the drive motor in this device, it is not only necessary to actuate the first contact element for polarity reversal of the drive motor, but rather a disengageable transfer element must also be moved by hand. In this case the transfer element located between the depth stop and the first contact element and which must be manipulated from the outside is comprised of a ring that is rotatable about the axis of the housing. Joined to the ring is a control cam with various axial extensions. Rotating the ring thus creates a free space for the first contact element so that it is no longer actuated, even though the depth stop is still in contact with the workpiece, and the drive motor can be switched into the opposite direction of rotation.

Aside from the considerable constructional expense required in this embodiment in order to make it possible to restart the drive motor when the depth stop is in contact, this operation can only be brought about with difficulty. The depth stop is under initial tension when in contact with the workpiece so that this bearing pressure must first be relieved in order to be able to then turn the ring which is bound to the depth stop by friction. This sometimes requires a difficult coordination of movements, since the tool clamped into the hand tool should or must often not be removed from a component part, such as a screw, to be manipulated. However, if the device is removed from the workpiece in order to turn the ring manually, the hand tool must be placed back again so that the component part can be screwed out. It is thus not possible to obtain optimum performance with the known device; on the contrary, operations that require the drive motor to drive the tool in both directions of rotation require a considerable amount of time.

The object of the invention is therefore to devise a hand tool of the type described above, the drive motor of which can be switched from clockwise to counter-clockwise rotation without the necessity of mechanical means and without the necessity of any manual manipulation of adjustment elements. Rather, the reversal of polarity of the drive motor should make it possible to automatically neutralize the locked position brought about by the depth stop by means of the second contact element so that screws can be driven in and out with no loss of time and without having to remove the hand tool. The constructional expense required to bring this about should be very low and almost no additional space should be required in the tool for the accommodation of the components needed for this purpose. Rather, working with such a device should be made easier to a considerable degree.

SUMMARY OF THE INVENTION

This is achieved in accordance with the invention in a hand tool of the class cited above by the fact that an electrical switching device connected to the drive motor is integrated into the electric circuit of the switching mechanism. Said switching device is arranged in a branch line bypassing the second contact element and by means of which the second contact element can be jumpered in the open operating position brought about by the depth stop by actuation of the first contact element for reversal of the direction of rotation of the drive motor.

In this connection, it is expedient to embody the electrical switching device as a diode, preferably as a Schottky diode, or as a transistor, preferably as a field-effect transistor and to connect it directly upstream or downstream of the drive motor.

According to an advantageous further development, provision is made for connecting a branch line to the break contact of the second contact element connecting said break contact with the electric circuit of the drive motor into which branch line an additional electrical switching device, such as in the form of a diode, is installed via which the drive motor can be short-circuited by the depth stop when the second contact element is opened. In this manner, the drive motor is brought to a stop immediately after the power supply is interrupted, thus making it impossible for it to coast.

If a hand tool is designed in accordance with the invention, it is possible in an extremely simple manner to eliminate the switching position of the second contact element brought about by operation of the depth stop. An electrical switching device arranged in a branch line making the flow of current in one direction possible but blocking it in the other direction of flow, jumpers the second contact element precisely when the polarity of the drive motor is reversed, enabling the drive motor to start in the opposite direction. It is thus not necessary to adjust mechanical elements nor are mechanical components needed, and furthermore, the hand tool need not be removed in order to reverse its direction of rotation and thus, for instance, remove a screw. Thus, with a low amount of constructional expense, it is possible for the electrical contact element provided and arranged in accordance with the proposed invention to improve the function of a hand tool and considerably facilitate its use.

The drawings show an exemplary embodiment of the hand tool with a depth stop designed in accordance with the invention, which will be explained in greater detail below.

DETAILED DESCRIPTION

Figure 1:
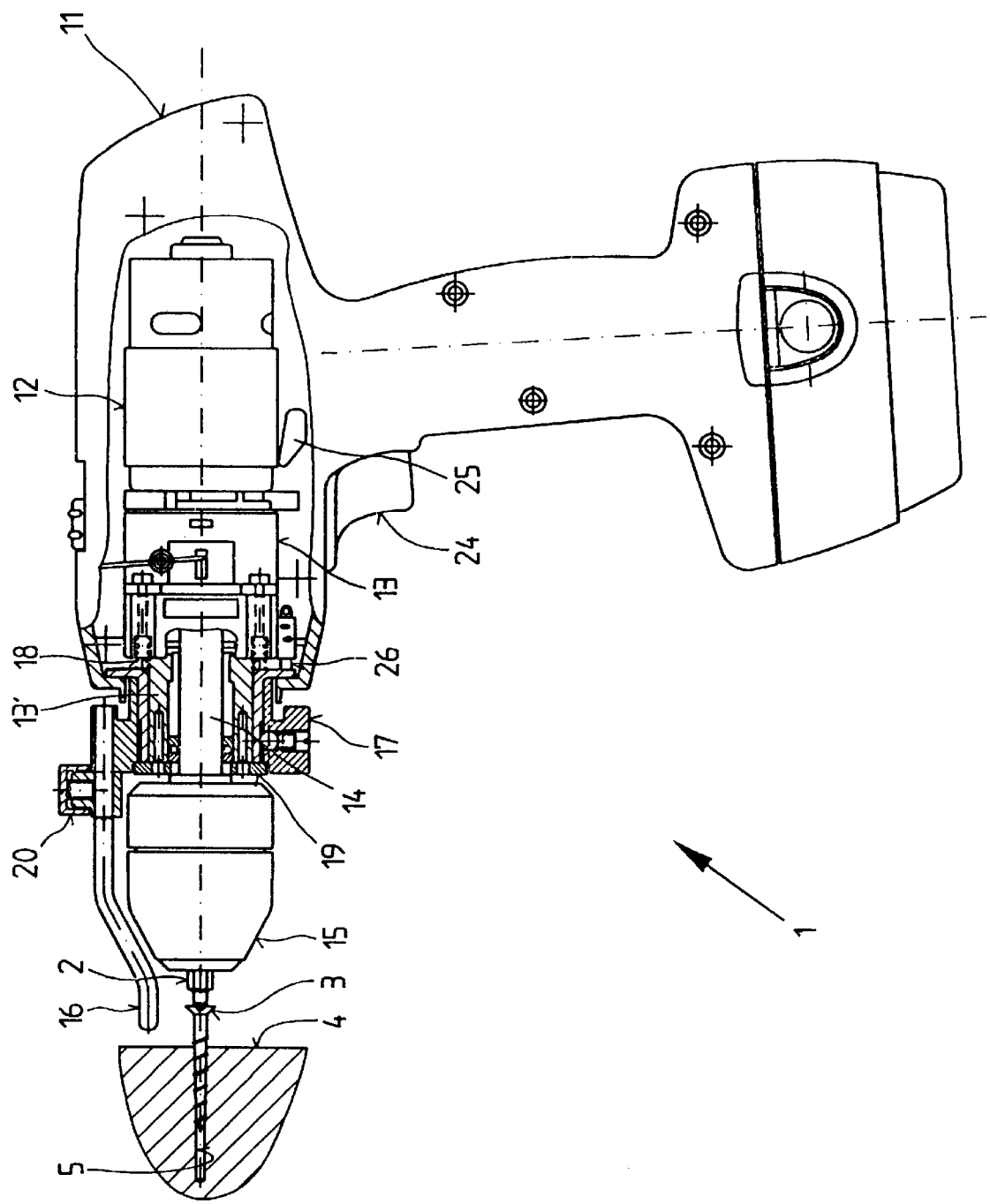
FIG. 1 shows a side and partial sectional view of a hand tool useful in the practice of the present invention.

The hand tool depicted in FIG. 1 and designated as 1 is designed as a cordless screwdriver and serves to turn a screw 3 into a bore 5 drilled into a workpiece 4 and/or to turn it out again by means of a tool bit 2. An electric drive motor 12 located in a closed housing 11 is provided to drive tool bit 2 embodied as a screwdriver bit installed in a drill chuck 15. The drive motor 12 is equipped with a gear unit 13, an output shaft 14 of which is fixedly connected to drill chuck 15.

The hand tool 1 is further provided with a depth stop 16 which prevents screw 3 from being screwed too deeply into workpiece 4. If depth stop 16 contacts workpiece 4 and further advance motion of hand tool 1 is provided in the same direction, the supply of power to drive motor 12 is interrupted so that it is brought to a stop. This is brought about by the fact that a sleeve 17 is displaceably supported on a hollow shaft 13'. The sleeve 17 interacts with a second contact element 26 of a switching mechanism 21 shown in detail in FIGS. 2 to 4. In a starting position, sleeve 17 is pressed tightly against a stop ring 19 fixedly connected with hollow shaft 13' by the force of springs 18 which are braced against gear unit 13. However, if depth stop 16, which is adjustable in its axial position by means of a set screw 20, is in contact with workpiece 4 and if hand tool 1 is further moved in its direction, the radially supported sleeve 17 acts upon the second contact element 26.

Figure 2:
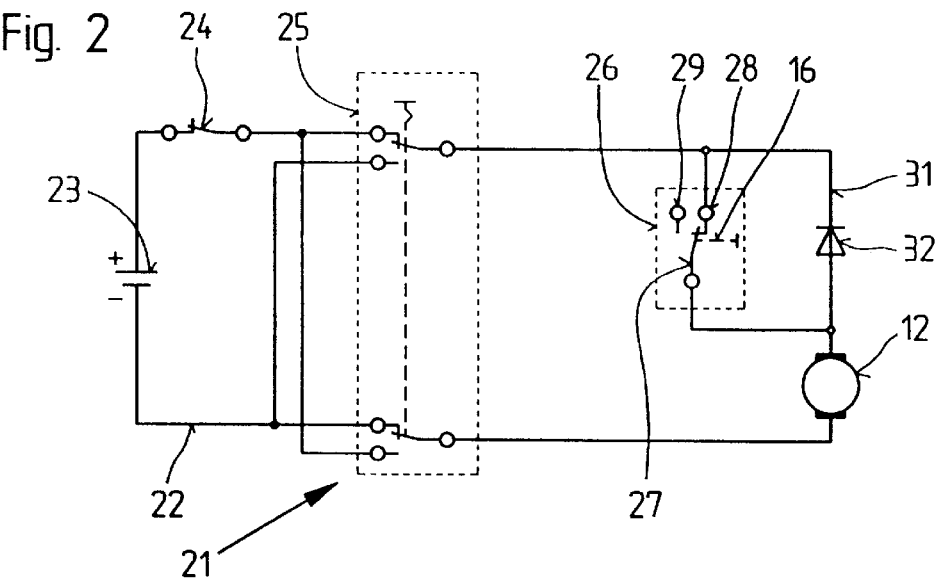
FIG. 2 shows a switching mechanism in a first switching position for a drive motor of the hand tool of FIG. 1 with the drive motor running in clockwise direction without actuation of the depth stop.
Figure 3:
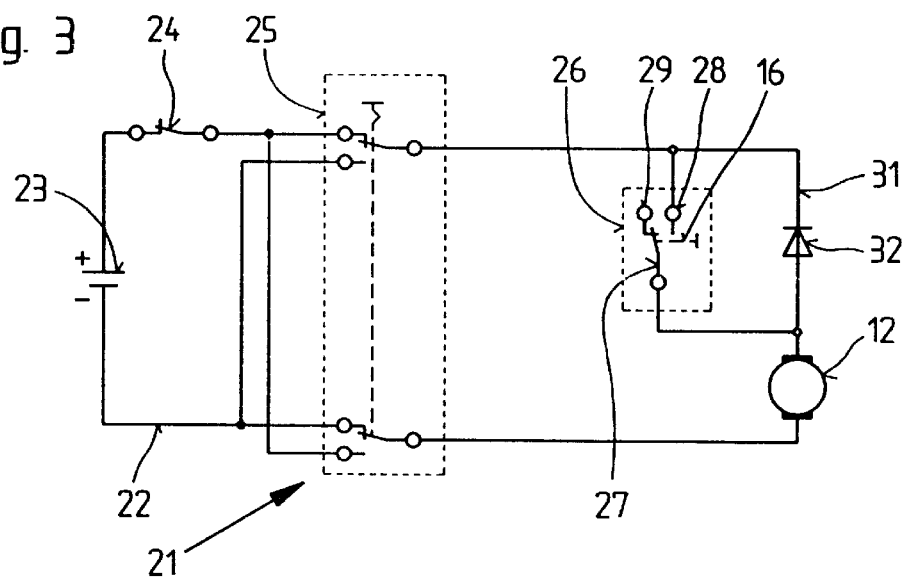
FIG. 3 shows the switching mechanism according to FIG. 2, but with actuation of the depth stop.
Figure 4:
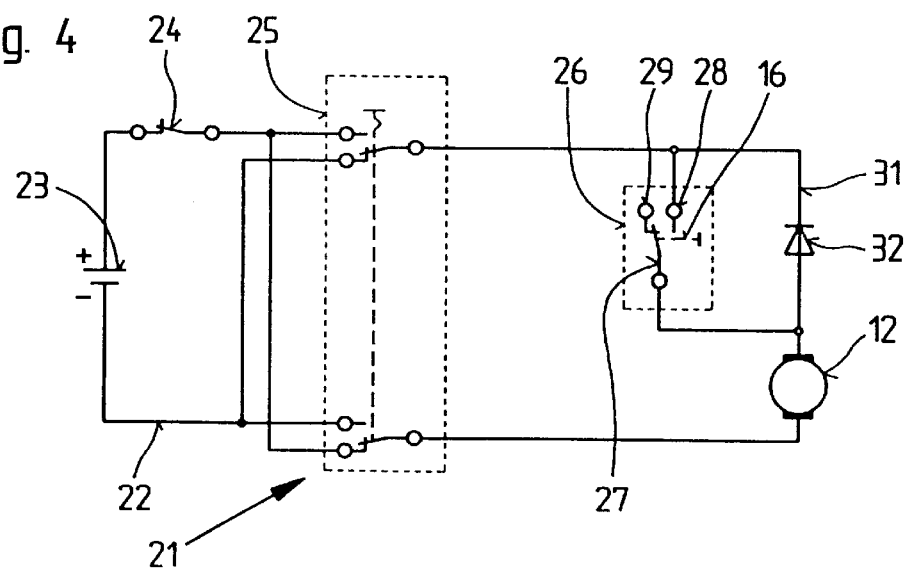
FIG. 4 shows the switching mechanism according to FIG. 3, but with reversal of polarity of the drive motor to a counter-clockwise rotation.

As the drawing of switching mechanism 21 shows in FIGS. 2 to 4, hand tool 1 is provided with an electric circuit 22 connected to a power source 23, such as a battery, into which circuit a switch 24 for switching drive motor 12 on and off is installed. In addition, the electric circuit 22 has a first contact element 25 for reversing the polarity of drive motor 12 and thus for switching from clockwise to counter-clockwise rotation or the reverse and a second contact element 26 for interruption of the supply of power to drive motor 12 by actuation of depth stop 16.

If, starting from the switching position according to FIG. 2, switch 24 is actuated and drive motor 12 is thus switched on, tool bit 2 is driven in a clockwise direction and screw 3 is screwed in, since the second contact element 26 is automatically held in a closed position and the first contact element 25 is in the operating position designated for clockwise rotation. However, as soon as depth stop 16 contacts workpiece 4, if hand tool 1 is further advanced, as shown in FIG. 3, the second contact element 26 is opened by depth stop 16 by the release of a switch lug 27 from a "make" contact 28 and is brought into contact with a "break" contact 29. The supply of power to drive motor 12 is interrupted as a result and motor 12 is brought to a stop.

In order to turn screw 3 back out again if necessary and thus be able to reverse the direction of rotation of drive motor 12 in this operating position without having to take special measures, it is only necessary to actuate the first contact element 25 with the second contact element 26 in an open position. An electric switching device 32, such as a Schottky diode, which blocks the flow of current in one direction but enables electrical power to pass in the other direction, is installed in a branch line 31 which bypasses the second contact element 26. If the first contact element 25 is actuated as in FIG. 4, the second contact element 26 is jumpered with the aid of the electrical switching device 32 by electrical power flowing from its anode to its cathode so that drive motor 12 is supplied with electrical power and rotates in a counter-clockwise direction. Screw 3 is thus screwed out of workpiece 4.

Figure 5:
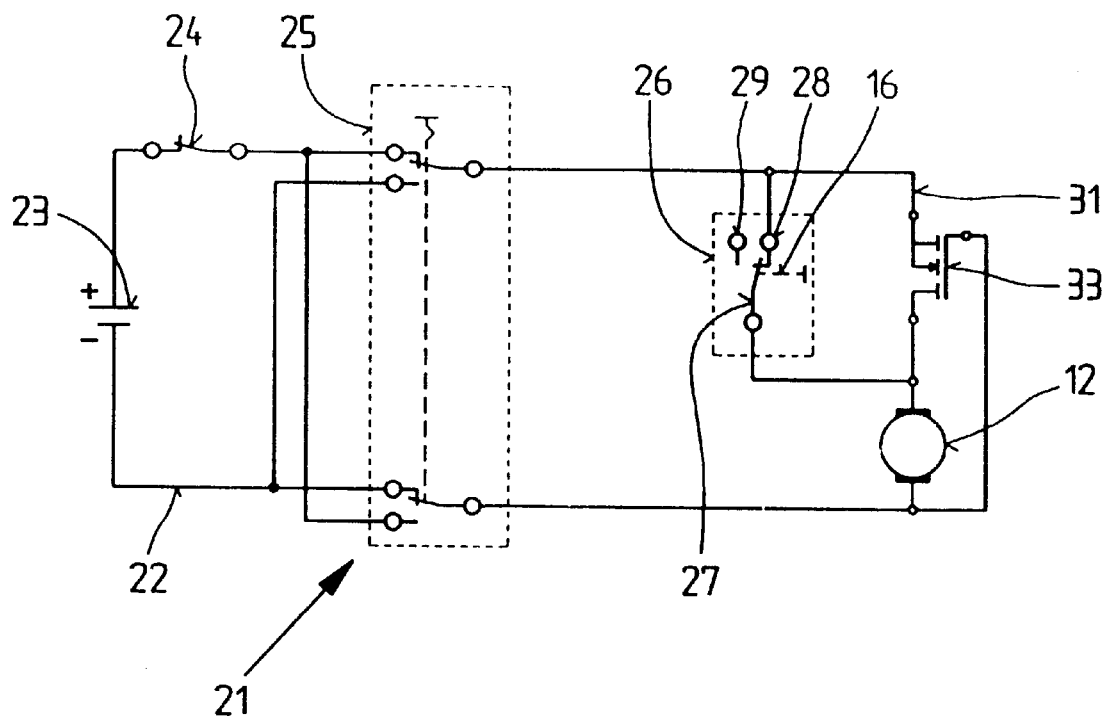
FIG. 5 shows the switching mechanism according to FIG. 2, but with a field-effect transistor as the electrical switching device.
Figure 6:
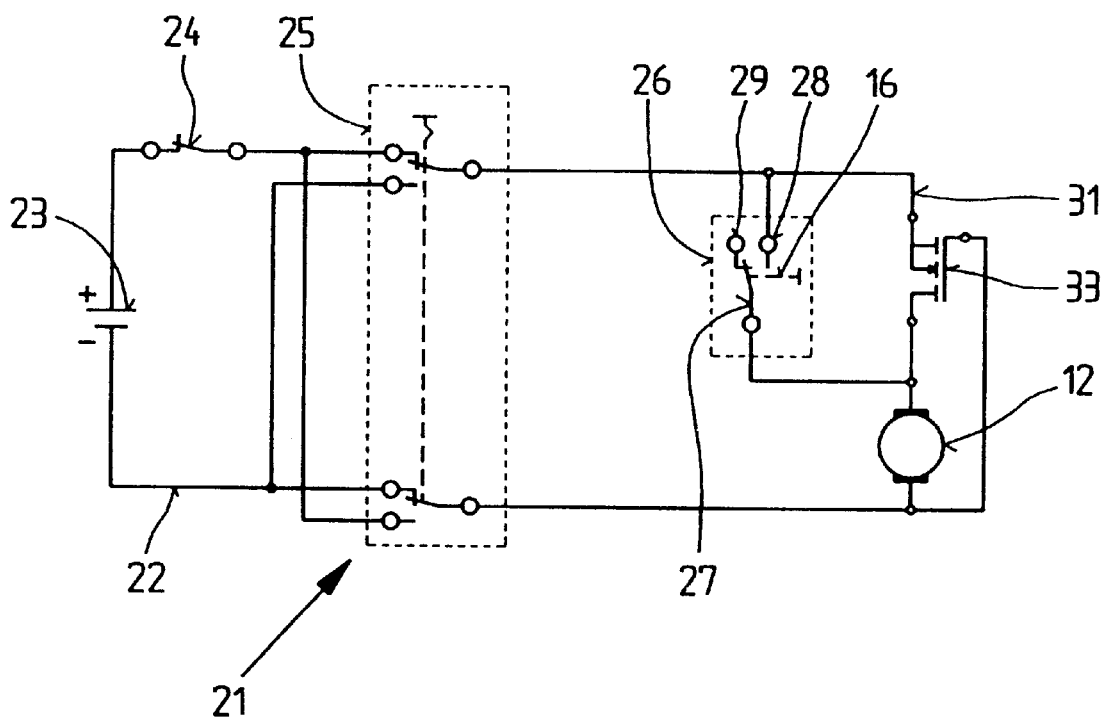
FIG. 6 shows the switching mechanism according to FIG. 3 with the field-effect transistor as the electrical switching device.

As shown in FIGS. 5 and 6, an equally effective field-effect transistor 33 may be provided instead of diode 32; however, voltage must be applied to it for jumpering the second contact element 26. The switching positions shown in FIGS. 5 and 6 correspond to the switching positions according to FIGS. 2 and 3.

Figure 7:
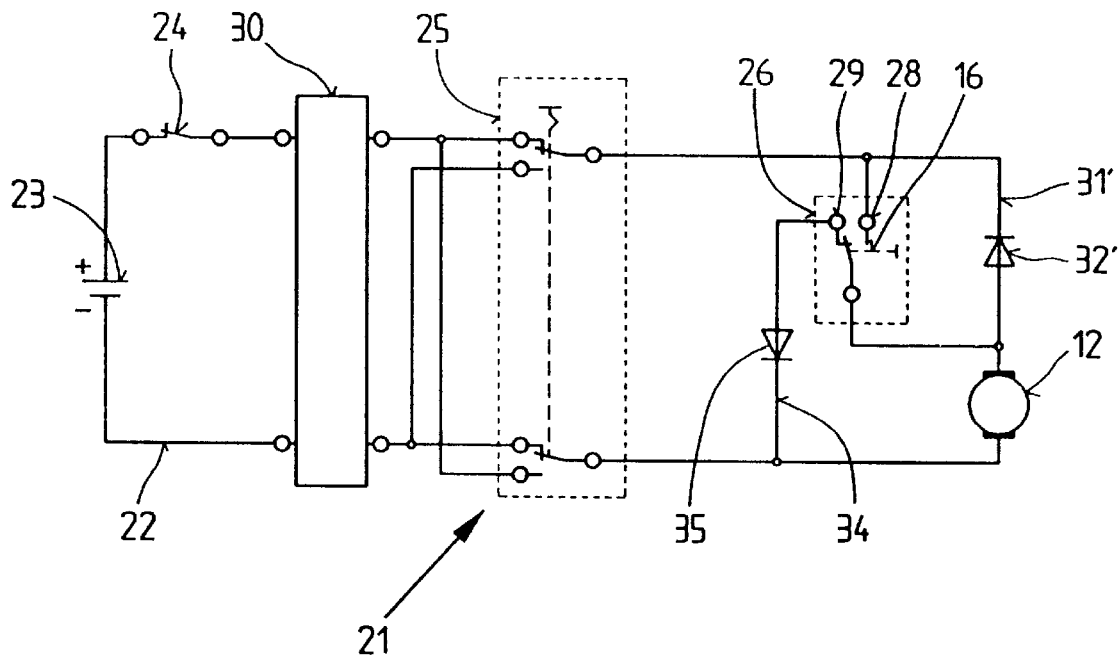
FIG. 7 shows the switching mechanism according to FIG. 3, but with an additional electrical switching device for short-circuiting the drive motor.

FIG. 7 shows the switching position of switching mechanism 21 according to FIG. 3. However, in this case, a branch line 34 is connected to "break" contact 29 of the second contact element 26 in which branch line an electric switching device 35 in the form of a diode is also installed. This makes it possible to short-circuit drive motor 12 immediately after the opening of the second contact element 26 so that the motor is immediately brought to a stop without coasting.

Figure 8:
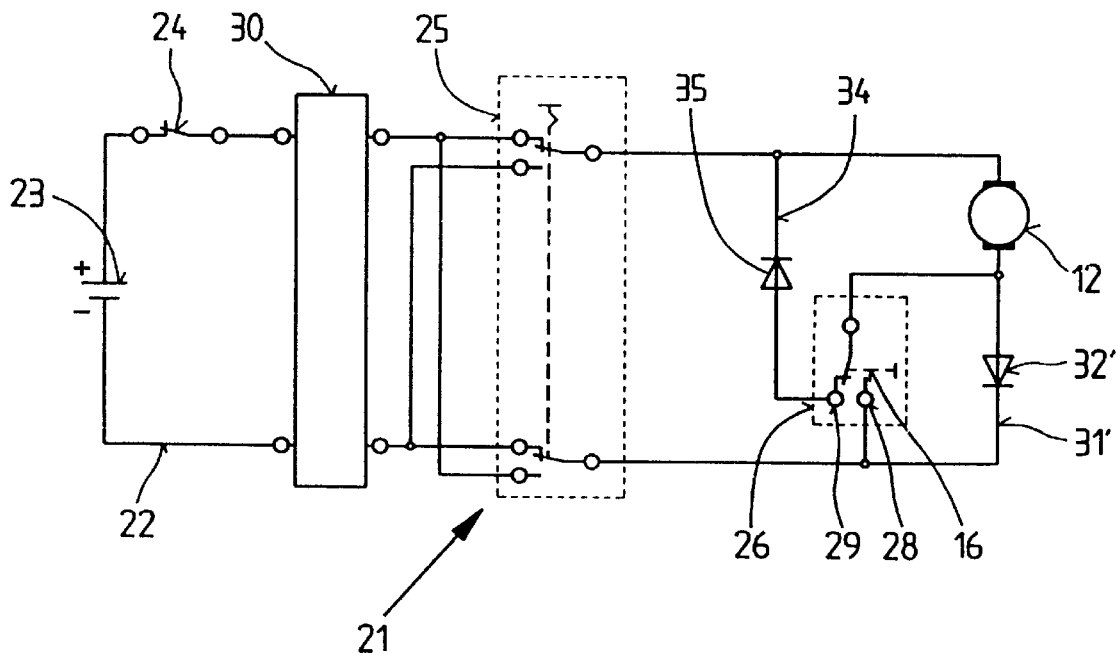
FIG. 8 shows the switching mechanism according to FIG. 3 with a different arrangement of the second contact element and the electrical switching devices as well as a speed controller.

In the switching mechanism 21 according to FIG. 8, the switching position of which corresponds to FIGS. 3 and 7, the second contact element 26 as well as a switching device 32' connected upstream of drive motor 12 in a branch line 31' are provided with a speed control 30. It is to be understood that the speed control 30 may be provided in all the embodiments of switching mechanism 21.

The invention is not to be taken as limited to all of the details thereof as modifications and variations thereof may be made without departing from the spirit of scope of the invention.

We claim:
1. A hand tool for the accurate insertion of screws, having:
   a housing;
   an electric drive motor arranged in the housing for the operation of a tool bit;
   an axially adjustable depth stop by which the drive motor can be switched off automatically when said depth stop contacts a workpiece;
   a switching mechanism having:
      an electric circuit that connects the switching mechanism to the drive motor;
      a switch installed in the electric circuit for switching the drive motor on and off;
      a first contact element for reversing the polarity of the drive motor for clockwise and counter-clockwise rotation; and
      a second contact element for switching off the drive motor by way of the depth stop; and
   an electrical switching device connected to the drive motor and integrated into the electric circuit of the switching mechanism, the switching device located in a branch line bypassing the second contact element and by way of which the second contact element can be jumpered in an open operating position brought about by the depth stop by actuation of the first contact element for reversal of the direction of rotation of the drive motor.

2. A hand tool in accordance with claim 1, wherein the electrical switching device is a diode.

3. The hand tool in accordance with claim 2, wherein the electrical switching device is connected immediately electrically adjacent to the drive motor.

4. The hand tool in accordance with claim 2, wherein the electrical switching device is connected immediately upstream of the drive motor.

5. The hand tool in accordance with claim 2, wherein the electrical switching device is connected immediately downstream of the drive motor.

6. The hand tool in accordance with claim 2, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

7. The hand tool in accordance with claim 1, wherein the electrical switching device is a Schottky diode.

8. The hand tool in accordance with claim 7, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

9. The hand tool in accordance with claim 1, wherein the electrical switching device is a transistor.

10. The hand tool in accordance with claim 9, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

11. The hand tool in accordance with claim 1, wherein the electrical switching device is a field-effect transistor.

12. The hand tool in accordance with claim 11, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

13. The hand tool in accordance with claim 1, wherein the electrical switching device is connected immediately electrically adjacent the drive motor.

14. The hand tool in accordance with claim 13, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

15. The hand tool in accordance with claim 1, wherein the electrical switching device is connected immediately upstream of the drive motor.

16. The hand tool in accordance with claim 15, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

17. The hand tool in accordance with claim 1, wherein the electrical switching device is connected immediately downstream of the drive motor.

18. The hand tool in accordance with claim 17, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

19. The hand tool in accordance with claim 1, wherein;

the second contact element includes a "break" contact; and the electrical circuit further includes a branch line connecting said "break" contact with the electric circuit and wherein said branch line has an additional electrical switching device for short-circuiting the drive motor when the second contact element is opened by the depth stop.

20. The hand tool in accordance with claim 19, wherein the additional electrical switching device is a diode.

* * * * *